United States Patent
Chen et al.

(10) Patent No.: US 9,296,358 B2
(45) Date of Patent: Mar. 29, 2016

(54) HEAD, TORSO AND KNEE COMBO AIRBAG

(71) Applicant: FORD GLOBAL TECHNOLOGIES, LLC, Dearborn, MI (US)

(72) Inventors: Roger Chen, Oxford, MI (US); Tzu-Chen Weng, Troy, MI (US); Kirk David Arthurs, Newport, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 14/095,248

(22) Filed: Dec. 3, 2013

(65) Prior Publication Data
US 2015/0151707 A1 Jun. 4, 2015

(51) Int. Cl.
*B60R 21/233* (2006.01)
*B60R 21/205* (2011.01)
*B60R 21/231* (2011.01)
*B60R 21/261* (2011.01)

(52) U.S. Cl.
CPC ............ *B60R 21/233* (2013.01); *B60R 21/205* (2013.01); *B60R 21/231* (2013.01); *B60R 21/261* (2013.01); *B60R 2021/23169* (2013.01); *B60R 2021/23324* (2013.01); *B60R 2021/2612* (2013.01)

(58) Field of Classification Search
CPC ................ B60R 21/206; B60R 21/261; B60R 2021/2612; B60R 2021/2615; B60R 21/205; B60R 21/231; B60R 21/233; B60R 2021/21369; B60R 2021/23324
See application file for complete search history.

(56) References Cited

U.S. PATENT DOCUMENTS

| 3,610,657 | A | * | 10/1971 | Cole | 280/729 |
| 3,642,303 | A | * | 2/1972 | Irish et al. | 280/730.1 |
| 3,767,225 | A | * | 10/1973 | Mazelsky | 280/729 |
| 3,788,665 | A | * | 1/1974 | Noll et al. | 280/729 |
| 4,043,572 | A | * | 8/1977 | Hattori et al. | 280/738 |
| 4,265,468 | A | * | 5/1981 | Suszko et al. | 280/729 |
| 4,290,627 | A | * | 9/1981 | Cumming et al. | 280/729 |
| 4,360,223 | A | * | 11/1982 | Kirchoff | 280/729 |

(Continued)

FOREIGN PATENT DOCUMENTS

DE 102006021662 11/2007

OTHER PUBLICATIONS

Moditech Rescue Solutions BV, http://www.moditech.com/rescue/index3.php?action=safety_system&page=airbag (Sep. 9, 2013).

*Primary Examiner* — Ruth Ilan
*Assistant Examiner* — Timothy Wilhelm
(74) *Attorney, Agent, or Firm* — Frank A. MacKenzie; Price Heneveld LLP

(57) ABSTRACT

A motor vehicle airbag system comprises a dual chambered combined head, torso, and knee airbag having a head and torso chamber and a lower extremities chamber in fluid communication with the head and torso chamber. A multidirectional inflator substantially simultaneously inflates both of the head and torso chamber and the lower extremities chamber. The head and torso chamber in the inflated condition acts against a head and a torso of the motor vehicle occupant to generate a restraining force against the occupant to mitigate contact of the occupant head and torso with the upper portion of the instrument panel during the impact event. The lower extremities chamber in the inflated condition acts against the pair of knees of the occupant to mitigate contact of the knees of the occupant with the lower portion of the panel during the impact event.

11 Claims, 5 Drawing Sheets

(56) References Cited

U.S. PATENT DOCUMENTS

| | | | |
|---|---|---|---|
| 5,022,675 A * | 6/1991 | Zelenak et al. | 280/743.1 |
| 5,505,485 A * | 4/1996 | Breed | 280/729 |
| 5,513,877 A * | 5/1996 | MacBrien et al. | 280/732 |
| 5,564,734 A | 10/1996 | Stuckle | |
| 6,024,377 A * | 2/2000 | Lane, Jr. | 280/728.3 |
| 6,276,716 B1 * | 8/2001 | Kato | 280/735 |
| 6,279,944 B1 | 8/2001 | Wipasuramonton et al. | |
| 6,382,668 B1 * | 5/2002 | Goetz | 280/737 |
| 6,769,714 B2 * | 8/2004 | Hosey et al. | 280/737 |
| 6,851,706 B2 | 2/2005 | Roberts et al. | |
| 7,021,652 B2 * | 4/2006 | Kumagai et al. | 280/729 |
| 7,540,531 B2 * | 6/2009 | Sakakibara et al. | 280/732 |
| 7,556,288 B2 | 7/2009 | Zauritz et al. | |
| 7,758,069 B2 | 7/2010 | Enders | |
| 8,215,665 B2 * | 7/2012 | Ohara et al. | 280/729 |
| 8,590,928 B2 * | 11/2013 | Spahn et al. | 280/739 |
| 2002/0149181 A1 * | 10/2002 | Eyrainer et al. | 280/730.1 |
| 2006/0145459 A1 | 7/2006 | Sendelbach et al. | |
| 2009/0218798 A1 | 9/2009 | Garner | |
| 2010/0133795 A1 | 6/2010 | Fukuda et al. | |
| 2011/0012328 A1 | 1/2011 | Ewing et al. | |
| 2012/0139216 A1 | 6/2012 | Scott et al. | |

* cited by examiner

HEAD, TORSO AND KNEE COMBO AIRBAG

FIELD OF THE INVENTION

The present invention generally relates to an airbag for a motor vehicle to optimize occupant protection during a frontal impact event, specifically a dual chambered airbag mounted in the middle of the instrument panel that is triggered to inflate in the event of and to mitigate frontal impacts to restrain the head, torso, and lower extremities of a motor vehicle occupant.

BACKGROUND OF THE INVENTION

Improving the crashworthiness of motor vehicles has long been the goal of automobile manufacturers and policymakers. In the United States, Federal Motor Vehicle Safety Standard (FMVSS) No. 208 was promulgated to encourage improved occupant responses to frontal impact events. In sum, FMVSS 208 presently requires that a simulated vehicle occupant experience head and thoracic de-accelerations and right and left femur loads within specified limits following a motor vehicle impact with a rigid barrier at an impact velocity of 35 MPH. Additionally, the National Highway and Traffic Administration conducts its New Car Assessment Program (NCAP), which reports the results of its testing to the public based on the testing conducted according to the procedures of FMVSS 208.

In view of such testing protocols, motor vehicle front end structures have been optimized to provide improved vehicle performance in such frontal impact events. That is, techniques have been adopted to absorb the kinetic energy from such frontal impacts and severity of the secondary impact that potentially occurs between the occupant and the interior components of the passenger compartment. In addition to engineered structures for front end components, such as the engine compartment, hood, fenders, and front wheel suspension, and undercarriage components, occupant restraint systems have been employed. Such occupant restraint systems include traditional seat belt systems, adaptive seat belt systems, padded instrument panels, padded knee bolsters and glove box doors, and airbag systems.

Airbag systems for use in motor vehicles are generally well-known in the art. Such airbag systems have been used within motor vehicle interiors to mitigate and reduce occupant impacts with motor vehicle interior components and structures, such as steering wheels, instrument panels, knee bolsters, glove boxes, side door panels, and body pillars. Airbag systems are designed to deploy substantially immediately upon detection of the impact event and stay inflated during at least the early phases of the impact event.

In the adoption of frontal impact airbags, however, it is sometimes necessary to utilize two separate airbags to restrain the occupant to obtain optimal test results within the specified criteria. In particular, in the case of the front seat passenger position, a first passenger airbag is often mounted in an upper portion of the instrument panel and, when inflated, engages the torso and head of the passenger. A separate second knee airbag may be mounted in a lower portion of the instrument panel and, when inflated, engages the lower extremities, in particular, the knees of the passenger, to reduce loading on the occupant's femurs. However, the use of a separate knee airbag incurs additional cost, complexity, and weight. For example, additional structural steel is required to attach the knee airbag to the instrument panel and provide appropriate reinforcement.

Further, designs of motor vehicle interiors, especially occupant compartments, are evolving toward increased space or roominess for the motor vehicle occupants. For example, it has been proposed to provide a single fixed front passenger seat displaced over 200 mm rearward from the traditional middle front seat adjustment position to accommodate front seat passengers of all sizes ($5^{th}$ percentile prototypical female occupant to the $95^{th}$ percentile prototypical large male occupants). However, restraining such a wide range of potential front seat occupants over such a long distance from the instrument panel disposed in front of the occupant creates a challenge in designing a single conventional front passenger airbag mounted on the top of the instrument panel. That is, the airbag load/displacement characteristics required to adequately restrain an unbelted $5^{th}$ percentile prototypical female are not the same as those required to adequately restrain an unbelted $50^{th}$ percentile prototypical male in a 25 mph frontal impact. Hence, solutions for obtaining acceptable simulated occupant responses for a wide spectrum of motor vehicle occupants using a rearwardly fixed forward facing front passenger seat, without the use of a separate knee airbag, would be advantageous.

The airbag assembly disclosed herein particularly accomplishes the foregoing optimization of simulated occupant response to a frontal impact event by providing a dual chambered head, torso, and knees combo airbag which deploys in the event of a frontal collision and provides uniform ride down energy and protection for the front passenger's head, torso, and lower extremities.

SUMMARY OF THE INVENTION

According to one aspect of the present disclosure, an airbag system is disclosed for mitigating motor vehicle occupant injuries in the event of a high speed impact of a motor vehicle with a frontal rigid barrier or other structure disposed in front of the motor vehicle, wherein the motor vehicle includes an occupant compartment having a forward facing front seat upon which an occupant is supported and an instrument panel disposed in front of and facing the forward facing front seat, wherein the instrument panel has an upper portion and a lower portion. The airbag system comprises a dual chambered combined head, torso, and knee airbag mounted on the instrument panel having a stowed condition and an inflated condition. The combined head, torso, and knee airbag has a head and torso chamber and a lower extremities chamber in fluid communication with the head and torso chamber. A single multi-directional inflator is operationally coupled with each of the head and torso chamber and the lower extremities chamber responsive to electrical actuation for inflating the combined head, torso, and knee airbag with a gas. An impact detection sensor generates and sends a signal upon an impact event to a controller for processing the signal generated by the detection sensor for electrically actuating the multidirectional inflator upon computing a predetermined impact severity to the motor vehicle. The head and torso chamber in the inflated condition acts against the head and torso of the occupant to generate a restraining force against the occupant to mitigate contact of the occupant's head and torso with the upper portion of the instrument panel during the impact event. The lower extremities chamber in the inflated condition acts against the pair of knees of the occupant to mitigate contact of the knees of the occupant with the lower portion of the panel during the impact event.

Still another aspect of the present disclosure is an airbag system wherein the multidirectional inflator is mounted within a housing disposed at the midpoint between the upper portion and lower portion of the instrument panel.

Yet another aspect of the present disclosure is an airbag system wherein the forward facing front seat is fixed.

An additional aspect of the present disclosure is an airbag system wherein the multidirectional inflator has a first nozzle supplying the head and torso chamber with the gas and a second nozzle supplying the lower extremities chamber the gas.

Another aspect of the present disclosure is an airbag system wherein the rate of pressure rise within each of the head and torso chamber and the lower extremities chamber is substantially simultaneous.

Still another aspect of the present disclosure is an airbag system wherein the combined head, torso, and knee airbag is provided with a baffle disposed between the head and torso chamber and the lower extremities chamber.

A further aspect of the present disclosure is an airbag system wherein the baffle is provided with a vent to provide fluid communication from the lower extremities chamber to the head and torso chamber.

Yet a further aspect of the present disclosure is an airbag system wherein the occupant compartment includes a windshield disposed adjacent and above the instrument panel that in part defines an upper space amid the head and torso of the motor vehicle occupant, the windshield, and the instrument panel, wherein the head and torso chamber in the inflated condition substantially fills the upper space amid the head and torso of the occupant, the windshield, and the instrument panel.

An additional aspect of the present disclosure is an airbag system wherein the lower portion of the instrument panel in part defines a lower gap between the knees of the occupant and the instrument panel, wherein the lower extremities chamber in the inflated condition substantially fills the lower gap between the knees of the occupant and the instrument panel.

Yet another aspect of the present disclosure is an airbag system wherein the combined head, torso, and knee airbag is provided with adaptive vents and tethers to control the deployment of the head and torso chamber.

A still further aspect of the present disclosure is a frontal airbag comprising a head and torso chamber, a lower extremities chamber in fluid communication with the head and torso chamber, and a single multidirectional inflator operationally coupled with each of the head and torso chamber and the lower extremities chamber, wherein the head and torso chamber when inflated acts against the head and torso of an occupant, and the lower extremities chamber when inflated acts against the pair of knees of the occupant.

Another aspect of the present disclosure is an airbag system for a motor vehicle wherein the inflator is mounted within a housing disposed at a midpoint forming a rearward apex between an upper portion and a lower portion of an instrument panel.

A yet additional aspect of the present disclosure is an airbag system wherein the head and torso chamber and the lower extremities chamber are inflated substantially simultaneously.

A further aspect of the present disclosure is an airbag system wherein the airbag comprises a baffle disposed between the head and torso chamber and the lower extremities chamber, the baffle having a vent to provide fluid communication from the lower extremities chamber to the head and torso chamber.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
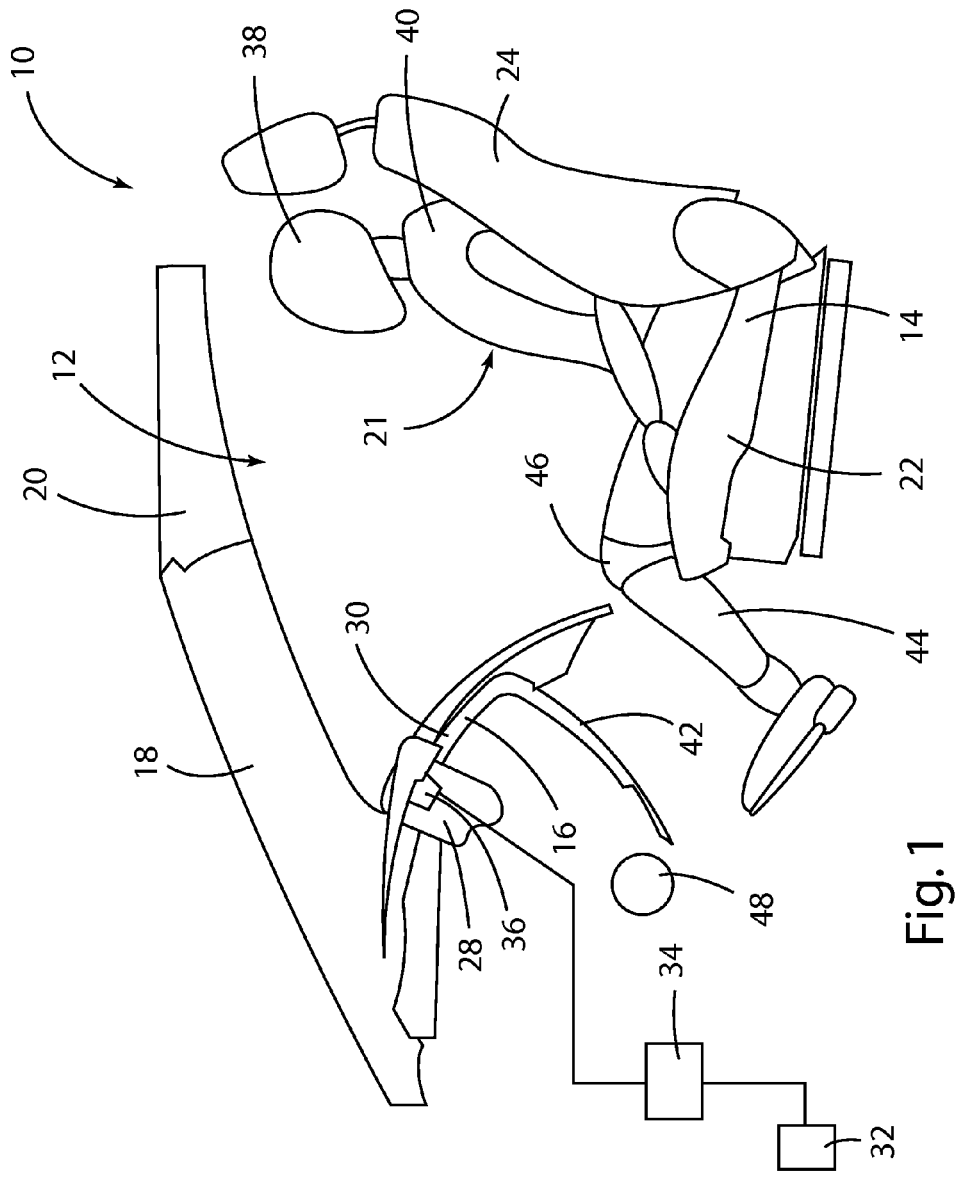
FIG. 1 is a side view of the occupant compartment of a motor vehicle within which an occupant is situated facing a passenger airbag of the prior art in the stowed condition prior initiation of the frontal impact event.
Figure 2:
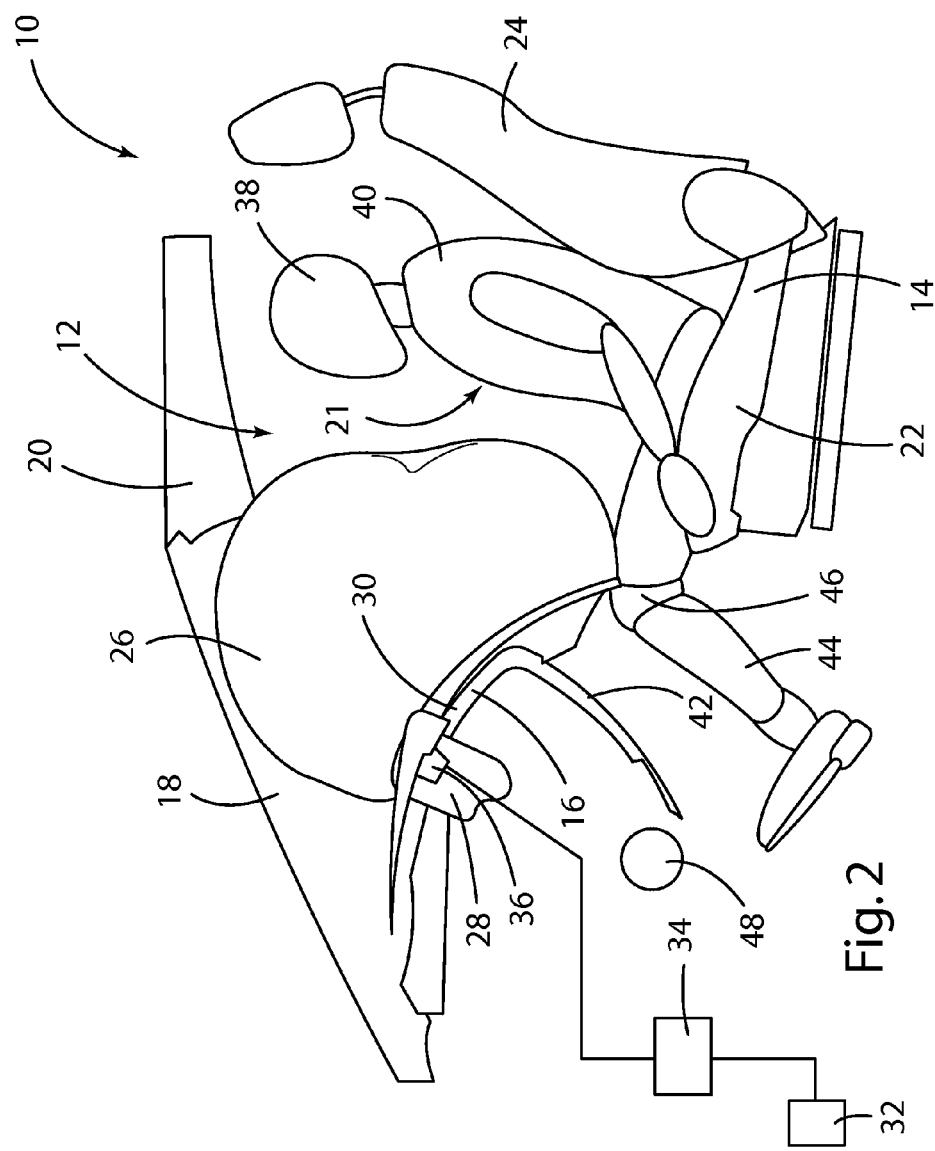
FIG. 2 is a side view of the occupant compartment of a motor vehicle within which an occupant is situated engaging a passenger airbag of the prior art in the inflated condition 50 milliseconds subsequent to the initiation of the frontal impact event.
Figure 3:
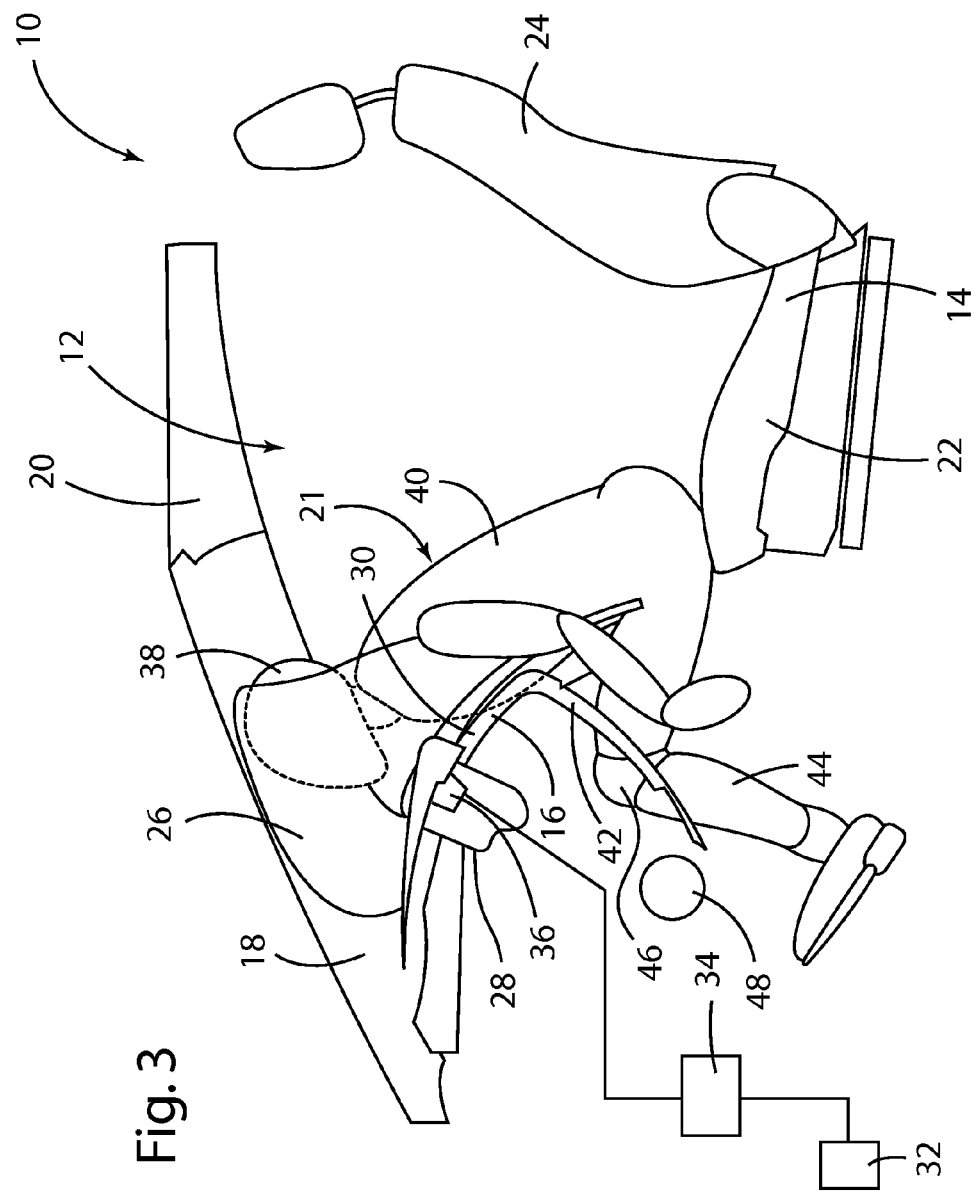
FIG. 3 is a side view of the occupant compartment of a motor vehicle within which an occupant is situated engaging a passenger airbag of the prior art in the inflated condition 100 milliseconds subsequent to the initiation of the frontal impact event.
Figure 4:
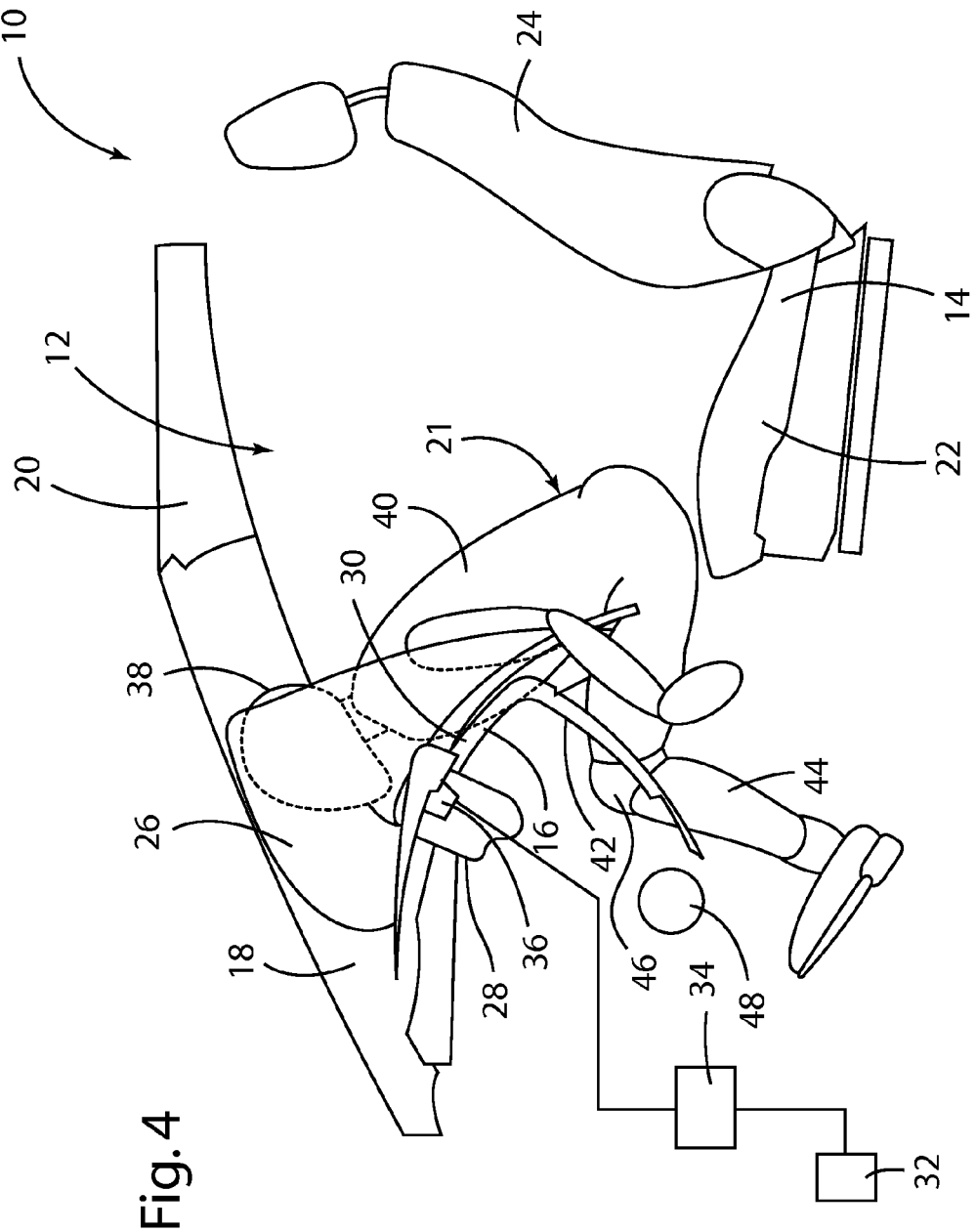
FIG. 4 is a side view of the occupant compartment of a motor vehicle within which an occupant is situated engaging a passenger airbag of the prior art in the inflated condition 120 milliseconds subsequent to the initiation of the frontal impact event.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, a motor vehicle 10 includes an interior occupant compartment 12 including a forward facing front seat assembly 14 and an instrument panel 16, the occupant compartment 12 being defined in part by a windshield 18 and a roof portion 20. An occupant 21, in particular, a forward facing front seat passenger, is supported by a forward facing front seat assembly 14 having a lower front seat 22 upon which the occupant 21 is supported and a seat back 24. The forward facing front seat assembly 14 is preferably fixed, as opposed to the typical configuration of moveable front seat tracks and rails (not shown) that allow the forward facing front seat assembly 14 to move forward and rearward. By moving the forward facing front seat assembly 14 rearward relative the traditional middle seat adjustment position (e.g., about 200 mm) and fixing the forward facing front seat assembly 14, it is possible to accommodate front seat passengers of all sizes (i.e., the $5^{th}$ percentile prototypical female occupant to the $95^{th}$ percentile prototypical large male occupant).

Although it is widely preferred that the forward facing front seat assembly occupant 21 be primarily restrained by a front passenger seat belt assembly (not shown), it is unfortunately all too common that such seat belt assemblies are not used. Thus, additional occupant protection may be provided by a standard passenger airbag 26, without the improvement disclosed herein, as shown in FIGS. 1-4. As is typical, the passenger airbag 26 is mounted in a recess 28 on the upper portion 30 of the instrument panel 16, proximate the windshield 18, facing upwardly and toward the front seat occupant 21, and disposed to actuate upon a frontal impact of a predetermined severity. That is, upon vehicle impact with a rigid barrier (not shown) an impact detection sensor 32 sends a signal to an electronic control unit or ECU 34. Once the signal is processed, the ECU 34 activates an inflator 36 operationally coupled with the front passenger airbag 26 to deploy the front passenger airbag 26. The passenger airbag 26, typically constructed from nylon or polyester, is configured such that the passenger airbag 26 will deploy and when in the inflated condition will substantially fill the space within the occupant compartment 12 below the windshield 18 proximate the instrument panel 16 and in front of the occupant 21, thereby creating a relatively compliant rearward surface against which the head 38 and torso 40 of the occupant 21 are restrained and which provides a resistant force during an impact event.

While the passenger airbag 26 shown in FIGS. 1-4 has proven to be extremely effective in obtaining compliance with the head and thoracic de-acceleration criteria of FMVSS 208 in simulated vehicle occupant responses, such a passenger airbag 26 is not itself effective in mitigating the right and left femur loads within the specified limits following a motor vehicle impact with a rigid front barrier at an impact velocity of 35 mph. For this purpose, padded knee bolsters (not shown) are often employed. Another solution for mitigating the right and left femur loads has been the adoption of a separate, second knee airbag (not shown) mounted in a lower portion 42 of the instrument panel 16 that, when inflated, engages the lower extremities 44, in particular, the knees 46 of the occupant 21 to reduce loading on the occupant's femurs. However, the use of a separate knee airbag incurs additional cost, complexity, and weight. Additional structural steel 48 is required to attach the separate knee airbag to the instrument panel 16 and provide appropriate reinforcement. Further, the use of a separate knee airbag requires two inflators 36, one for the passenger airbag 26 and one for the knee airbag, in order to provide optimized occupant protection. That is, two airbags, two igniters, and duplicate related circuitry are required.

Further, the trend toward increased space or roominess for the motor vehicle occupant 21 by fixing the forward facing front passenger seat 14 over 200 mm rearward from the traditional middle front seat adjustment position creates challenges for a single front passenger airbag 26 design and deployment characteristics. Also, restraining a wide range of potential front seat occupant 21 sizes and masses (i.e., the $5^{th}$ percentile prototypical female occupant to the $95^{th}$ percentile prototypical large male occupants) over such a long distance creates additional challenges in designing a single front passenger airbag 26 mounted on the upper portion 30 of the instrument panel 16. That is, the airbag load/displacement characteristics required to adequately restrain an unbelted $5^{th}$ percentile prototypical female are not the same as those required to adequately restrain an unbelted $50^{th}$ percentile prototypical male in a 25 mph frontal impact.

For example, as shown in the simulations depicted in FIGS. 1-4, just prior to the impact event and traditional airbag deployment, an unbelted 5th percentile prototypical female is shown supported in the front lower seat 22 facing the instrument panel 16, as depicted in FIG. 1. Approximately 12 milliseconds after the impact event and detection of the impact event by the sensor 32, the inflator 36 is actuated and has inflated the airbag 26, as shown in the simulation depicted in FIG. 2. Although the $5^{th}$ percentile prototypical female, as shown, has just begun to move forward relative the lower front seat 22 and instrument panel 16, it should be noted that there remains a substantial gap between the $5^{th}$ percentile prototypical female and the instrument panel 16. At approximately 100 milliseconds after the impact event, as shown in the simulation depicted in FIG. 3, the airbag has already began to deflate via an external vent (not shown). The torso of the $5^{th}$ percentile prototypical female, however, has just made contact with the airbag 26 and is shown essentially bottoming-out against the upper portion 30 of the instrument panel 16, while the lower extremities 44 of the $5^{th}$ percentile prototypical female have made contact with the lower portion 42 of the instrument panel 16. Finally, as shown in the simulation depicted in FIG. 4, at approximately 120 milliseconds after the impact event, the $5^{th}$ percentile prototypical female is shown essentially unmoved in the forward direction, but has now dropped down onto a forward portion of the lower front seat 22.

The new combined head, torso, and knee airbag 50 of the present disclosure overcomes these challenges and provides effective ride-down to the occupants of all sizes and masses and uniform restraint to an occupant's head 38, torso 40, and knees 46. The combined head, torso, and knee airbag 50 of the present disclosure also provides an effective in-position airbag deployment solution to the airbag systems of the prior art.

The disclosed combined head, torso, and knee airbag 50 is also preferably constructed of nylon or polyester and is mounted in the stowed condition within a housing 52 preferably located at a midpoint 54 between an upper portion 30 and lower portion 42 of the instrument panel 16. Moreover, it is preferred that the midpoint 54 of the instrument panel 16 has a rearward apex 56 and that the combined head, torso, and knee airbag 50 is mounted at the rearward apex 56 so as to be as close to the occupant 21 as possible.

The combined head, torso, and knee airbag 50 has a head and torso chamber 58 when in the inflated condition. The volume of the head and torso chamber 58 is oversized relative conventional airbags 26 and preferably substantially fills the space defined by the windshield 18 disposed adjacent and above the instrument panel 16, the instrument panel and the occupant 21, bearing in mind that the occupant 21 is disposed about 200 mm further rearward from the instrument panel 16 than is conventional. The head and torso chamber 58 thus acts against the head 38 and torso 40 of the occupant 21 in the inflated condition so as to generate a restraining force against the occupant 21.

Figure 5:
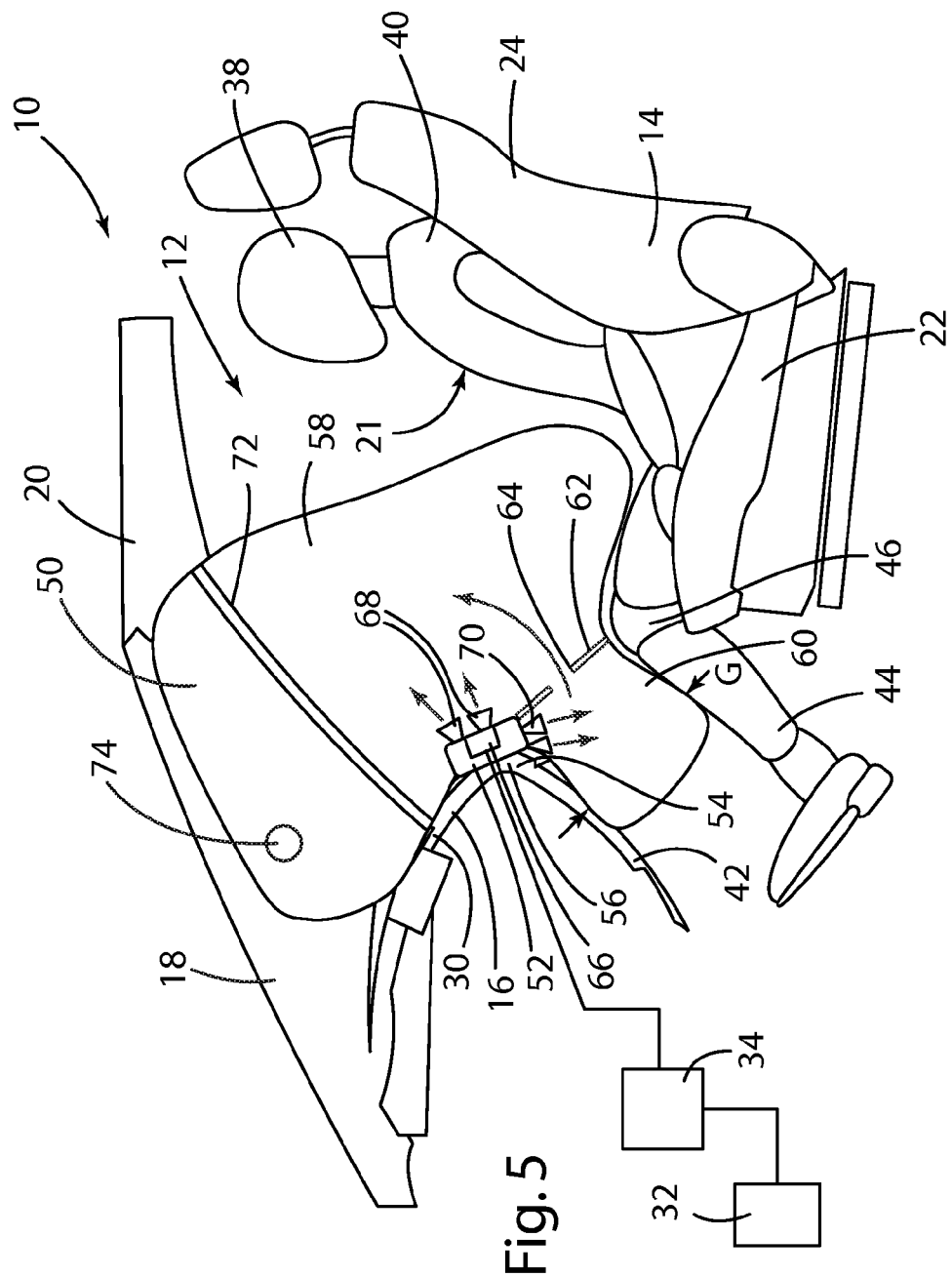
FIG. 5 is a side view of the occupant compartment of a motor vehicle within which an occupant is situated engaging a combined head, torso, and knee airbag in accordance with the present disclosure in the inflated condition 50 milliseconds subsequent to the initiation of the frontal impact event.

The combined head, torso, and knee airbag 50 of the present disclosure also has a lower extremities chamber 60 in fluid communication with the head and torso chamber 58, as shown in FIG. 5. The lower portion 42 of the instrument panel 16 in part defines a lower gap G between the knees 46 of the occupant 21 and the lower portion 42 of the instrument panel 16, wherein the lower extremities chamber 60 in the inflated condition substantially fills the lower gap G between the knees 46 of the occupant 21 and the instrument panel 16. The lower extremities chamber 60 thus acts against the pair of knees 46 of the occupant 21 in the inflated condition so as to mitigate contact of the knees 46 of the occupant 21 with the lower portion 42 of the instrument panel 16 during an impact event. Preferably, the width of the lower extremities chamber 60 is sufficient to ensure contact by both knees 46 of the occupant 21, while the depth of the lower extremities chamber 60 is sufficient to ensure vertical contact of the knees 46 of the occupant 21.

A baffle 62 extends between the head and torso chamber 58 and the lower extremities chamber 60 and allows for fluid communication between the two chambers 58, 60 via a vent 64 preferably disposed in the middle of the baffle 62. In practice, the vent 64 in the baffle 62 allows gas to flow from the lower extremities chamber 60 to the head and torso chamber 58, yet tends to restrict gas flow to a certain extent. In so doing, the baffle 62 contributes to faster inflation of the lower extremities chamber 60 in comparison to traditional knee airbags.

A multidirectional inflator 66 is operationally coupled with the combined head, torso, and knee airbag 60 and is responsive to electrical actuation for inflating the integrated airbag with a gas, such as sodium azide, when the impact detection sensor 32 generates a signal upon an impact event and directs the signal to the controller 34 for processing the signal generated by the detection sensor 32 upon computing a predetermined impact severity to the motor vehicle 10. Preferably, the multidirectional inflator 66 has at least two separate nozzles 68, 70, which may be provided in pairs as shown, operationally coupled with the chambers, a first nozzle 68 supplying gas to the head and torso chamber 58 and a second nozzle 70 supplying gas to the lower extremities chamber 60, to substantially simultaneously inflate each of the head and torso chamber 58 and the lower extremities chamber 60. That is, the rate of pressure rise within each of the head and torso chamber 58 and the lower extremities chamber 60 is substantially the same. Whereas with prior designs, which would require two modules (one each for the passenger airbag and knee airbag) to protect the occupant's head 38, torso 40, and lower extremities 44, the combined head, torso, and knee airbag 50 disclosed herein eliminates such duplication.

As is known, tethers 72 may be used to control the shape of the combined head, torso, and knee airbag 50 during deployment. Also, adaptive vents 74 may be included to tune the combined head, torso, and knee airbag 50 to meet the testing requirements. The combined head, torso, and knee airbag 50 thus fills the void between occupant's lower extremities 44 and the lower portion 42 of the instrument panel 16, such as a glove box, as well as the void between the occupant's head 38, torso 40, windshield 18, and instrument panel 16. The combined head, torso, and knee airbag 50 is designed to deploy faster and can thereby be in the fully deployed position, which is further rearward, faster than conventional passenger airbag 26 designs. Further, by constructing the head and torso chamber 58 in an oversized volume and by fully deploying the head and torso chamber 58 closer to and engaging the occupant 21 sooner, the forward motion of the occupant 21 before engaging the head and torso chamber 58 is reduced and an effective in-position airbag deployment may be realized. The combined head, torso, and knee airbag 50 thus provides uniform restraint to the occupant's head 38, torso 40, and knees 46.

The combined head, torso, and knee airbag 50 disclosed herein is lightweight, requires minimum packaging, and utilizes well-proven inflator technology. Further, the disclosed combined head, torso, and knee frontal impact airbag system 50 avoids the additional cost, complexity, and weight of a separate knee airbag. The additional structural steel 48 required to attach the knee airbag to the instrument panel 16 and provide appropriate reinforcement is completely avoided.

The disclosed combined head, torso, and knee airbag 50 is believed to provide unique occupant protection for the lower extremities 44 of the occupant 21. Thus, a cost-effective method of employing an airbag system to generate a resistive force against an occupant 21 in the event of a high speed impact of a motor vehicle 10 with a frontal rigid barrier or other structure disposed in front of the motor vehicle 10 to restrain the occupant 21 from impact with interior components of the motor vehicle 10 is disclosed, as set forth above. In operation, a combined head, torso, and knee airbag 50 is provided within an occupant compartment 12 provided with a forward facing seat assembly 14 upon which an occupant 21 is supported and an instrument panel 16 disposed in front of and facing the forward facing front seat assembly 14, wherein the instrument panel 16 has an upper portion 30 and a lower portion 42. The combined head, torso, and knee airbag 50 has a head and torso chamber 58 and a lower extremities chamber 60 separated by a baffle 62 to control the inflation rate of each chamber. The impact detection sensor 32 mounted in the motor vehicle 10 generates a signal upon a frontal impact event proximate the front of the motor vehicle 10 and provides the signal to a controller 34. The multidirectional inflator 66, having at least a first nozzle 68 directed to the head and torso chamber 58 and the second nozzle 70 directed to the lower extremities chamber 60, is responsive to electrical actuation for substantially inflating both the head and torso chamber 58 and lower extremities chamber 60 with a gas when the controller 34 computes a predetermined impact severity to the motor vehicle 10. The head and torso chamber 58 is inflated to act against the head 38 and torso 40 of the occupant 21 so as to generate a restraining force against the occupant 21, while the lower extremities chamber 60 is inflated to act against the pair of knees 46 of the occupant 21 so as to mitigate contact of the knees 46 of the occupant 21 with the lower portion 42 of the instrument panel 16 during an impact event.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An airbag system for mitigating motor vehicle occupant injuries in the event of a high speed impact event of a motor vehicle with a frontal rigid barrier or other structure disposed in front of the motor vehicle, wherein the motor vehicle includes an occupant compartment having a forward facing front seat upon which an occupant is supported and an instrument panel disposed in front of and facing the forward facing front seat, wherein the instrument panel has an upper portion and a lower portion, the airbag system comprising:
   a dual chambered combined head, torso, and knee airbag mounted on the instrument panel, the combined head, torso, and knee airbag having a stowed condition and an inflated condition, wherein the combined head, torso, and knee airbag in the inflated condition has a head and torso chamber and a lower extremities chamber in fluid communication with the head and torso chamber;
   a single multidirectional inflator operationally coupled with each of the head and torso chamber and the lower extremities chamber responsive to electrical actuation for inflating the combined head, torso, and knee airbag with a gas;
   an impact detection sensor for generating a signal upon an impact event; and
   a controller for processing the signal generated by the detection sensor and electrically actuating the multidirectional inflator upon computing a predetermined impact severity to the motor vehicle, wherein the head and torso chamber in the inflated condition acts against a head and a torso of the occupant so as to generate a restraining force against the occupant to mitigate contact of the occupant's head and torso with the upper portion of the instrument panel during the impact event and the lower extremities chamber in the inflated condition acts against a pair of knees of the occupant so as to mitigate contact of the occupant's knees with the lower portion of the panel during the impact event, and wherein the head and torso chamber and the lower extremities chamber each experience a rate of pressure rise during the impact event, the rate of pressure rise within each of the head and torso chamber and the lower extremities chamber being substantially the same.

2. The airbag system of claim 1, wherein the multidirectional inflator is mounted within a housing disposed at a midpoint between the upper portion and the lower portion of the instrument panel.

3. The airbag system of claim 1, wherein the forward facing front seat is fixed.

4. The airbag system of claim 1, wherein the multidirectional inflator has a first nozzle supplying the head and torso chamber with the gas and a second nozzle supplying the lower extremities chamber the gas.

5. The airbag system of claim 1, wherein the combined head, torso, and knee airbag is provided with a baffle disposed between the head and torso chamber and the lower extremities chamber.

6. The airbag system of claim 5, wherein the baffle is provided with a vent to provide fluid communication from the lower extremities chamber to the head and torso chamber.

7. The airbag system of claim 1, wherein the occupant compartment includes a windshield disposed adjacent and above the instrument panel that in part defines an upper space amid the head and torso of the occupant, the windshield, and the instrument panel, wherein the head and torso chamber in the inflated condition substantially fills the upper space amid the head and torso of the occupant, the windshield, and the instrument panel.

8. The airbag system of claim 1, wherein the lower portion of the instrument panel in part defines a lower gap between the knees of the occupant and the instrument panel, wherein the lower extremities chamber in the inflated condition substantially fills the lower gap between the knees of the occupant and the instrument panel.

9. The airbag system of claim 1, wherein the combined head, torso, and knee airbag is provided with adaptive vents and tethers to control deployment of the head and torso chamber.

10. A method of employing an airbag system to generate a resistant force against an occupant to restrain the occupant from impact with an interior component of the motor vehicle, wherein the method comprises the steps of:

providing an airbag to generate a resistive force against an occupant in the event of a high speed impact of a motor vehicle with a frontal rigid barrier or other structure disposed in front of the motor vehicle to restrain the occupant from impact with the interior component of the motor vehicle;

separating the airbag into a head and torso chamber and a lower extremities chamber separated by a baffle;

mounting an impact detection sensor mounted in the motor vehicle to generate a signal upon a frontal impact event proximate the front of the motor vehicle and provide the signal to a controller;

mounting a single multidirectional inflator on a rearward surface of an instrument panel, the multidirectional inflator having at least one nozzle directed to the head and torso chamber and another nozzle directed to the lower extremities chamber, wherein the multidirectional inflator is responsive to electrical actuation for substantially simultaneously inflating both the head and torso chamber and lower extremities chamber with a gas when the controller computes a predetermined impact severity to the motor vehicle;

inflating the head and torso chamber at a first rate of pressure rise to act against a head and torso of the occupant to generate a restraining force against the occupant; and inflating the lower extremities chamber at a second the rate of pressure rise substantially the same as the first rate of pressure rise to act against a pair of knees of the occupant so as to mitigate contact of the knees with the motor vehicle.

11. The method of claim 10, wherein the airbag comprising the baffle is disposed between the head and torso chamber and the lower extremities chamber, the baffle having a vent to provide fluid communication from the lower extremities chamber to the head and torso chamber.

* * * * *